(12) United States Patent
Dovrat et al.

(10) Patent No.: US 12,449,147 B2
(45) Date of Patent: Oct. 21, 2025

(54) ROTATING PLATE MISTING FAN

(71) Applicant: MAXIFY INC., Charlotte, NC (US)

(72) Inventors: Michael Dovrat, Modiin (IL); Ofir Baharav, Los Altos Hills, CA (US); Yaniv Kiffel, Givatayim (IL); Drayton Diggs, Harrisburg, NC (US); Ryan Hittepole, Mount Pleasant, NC (US)

(73) Assignee: MAXIFY SOLUTIONS, INC., Charlotte, NC (US)

( * ) Notice: Subject to any disclaimer, the term of this patent is extended or adjusted under 35 U.S.C. 154(b) by 221 days.

(21) Appl. No.: 18/111,256

(22) Filed: Feb. 17, 2023

(65) Prior Publication Data

US 2023/0280053 A1 Sep. 7, 2023

Related U.S. Application Data

(63) Continuation of application No. PCT/US2021/046500, filed on Aug. 18, 2021.
(Continued)

(51) Int. Cl.
*F24F 6/06* (2006.01)
*F04D 27/00* (2006.01)
*F04D 29/70* (2006.01)
*F24F 5/00* (2006.01)
*F24F 6/00* (2006.01)

(52) U.S. Cl.
CPC .............. *F24F 6/06* (2013.01); *F04D 27/004* (2013.01); *F04D 29/703* (2013.01); *F24F 5/0035* (2013.01); *F24F 2006/008* (2013.01); *F24F 2221/12* (2013.01)

(58) Field of Classification Search
CPC ...... F24F 6/06; F24F 5/0035; F24F 2006/008; F24F 2221/12; F24F 6/16; F04D 27/004; F04D 29/703; B05B 3/1021; B05B 3/105; Y02A 40/25; Y02B 30/54
See application file for complete search history.

(56) References Cited

U.S. PATENT DOCUMENTS

| 1,808,183 | A | 6/1931 | Spaulding |
| 1,966,872 | A | 7/1934 | Simpson |

(Continued)

FOREIGN PATENT DOCUMENTS

| CN | 2509495 Y | 9/2002 | |
| CN | 110067762 A * | 7/2019 | ........... F04D 27/004 |

(Continued)

OTHER PUBLICATIONS

JP 4869105 B2 Translation (Year: 2012).*
(Continued)

*Primary Examiner* — Jerry-Daryl Fletcher
*Assistant Examiner* — Dario Antonio Deleon
(74) *Attorney, Agent, or Firm* — PEARL COHEN ZEDEK LATZER BARATZ LLP

(57) ABSTRACT

A rotating plate misting fan (RPMF) capable of delivering cooling to industrial environments including loading bays for docked trailers, includes a rotating plate assembly configured to eliminate or minimize water collection in the environment area and a controller configured to automatically adjust a vapor rate and fan speed of the fan as a function of distance to objects in proximity to the rotating plate misting fan and psychrometric parameters.

13 Claims, 12 Drawing Sheets

Related U.S. Application Data

(60) Provisional application No. 63/067,035, filed on Aug. 18, 2020.

(56) References Cited

U.S. PATENT DOCUMENTS

| | | | |
|---|---|---|---|
| 1,998,284 | A | 4/1935 | Matthews et al. |
| 2,060,257 | A | 11/1936 | Southworth |
| 2,101,603 | A | 12/1937 | Stimson |
| 2,163,474 | A * | 6/1939 | Sloan ............... F24F 6/06 261/30 |
| 2,238,120 | A * | 4/1941 | Launder ............ A01M 7/0014 239/77 |
| 2,399,108 | A * | 4/1946 | Feinberg ............ F24F 6/06 261/24 |
| 6,789,787 | B2 | 9/2004 | Stutts |
| 8,985,557 | B2 | 3/2015 | Canipe et al. |
| D771,786 | S | 11/2016 | Canipe et al. |
| 2004/0073997 | A1* | 4/2004 | Cannetti ............ A47K 7/046 4/606 |
| 2005/0271529 | A1 | 12/2005 | Stommel et al. |
| 2006/0000227 | A1* | 1/2006 | Hyland et al. ...... F24F 5/0035 62/236 |
| 2008/0023857 | A1* | 1/2008 | Dos Santos et al. ..... F24F 6/16 261/83 |
| 2017/0082306 | A1* | 3/2017 | Murakami ............ F24F 6/00 |
| 2019/0176171 | A1* | 6/2019 | Hendy ............... B05B 3/0427 |
| 2020/0173670 | A1* | 6/2020 | Suzuki et al. .... F24F 2006/008 |
| 2021/0325060 | A1* | 10/2021 | Brown .................. F24F 6/14 |

FOREIGN PATENT DOCUMENTS

| | | | | |
|---|---|---|---|---|
| CN | 111379743 | A * | 7/2020 | ........... F04D 29/703 |
| JP | 4869105 | B2 * | 2/2012 | ............. F24F 13/22 |
| WO | WO2005/119130 | A1 | 12/2005 | |
| WO | WO2022/040309 | A1 | 2/2022 | |

OTHER PUBLICATIONS

CN 110067762 A Translation (Year: 2019).*
CN 111379743 A Translation (Year: 2020).*
Search Report for European Patent Application No. 21859055.2, dated Jul. 12, 2024.
International Search Report and Written Opinion in Corresponding PCT Application No. PCT/US2021/046500, mailed on Nov. 30, 2021.
Office Action for U.S. Appl. No. 17/561,416, dated May 12, 2022.

* cited by examiner

ROTATING PLATE MISTING FAN

CROSS-REFERENCE TO RELATED APPLICATIONS

This application is a continuation of International Application PCT/US2021/046500, filed Aug. 18, 2021, which claims the benefit of U.S. Provisional Patent Application 63/067,035, filed Aug. 18, 2020, both of which are incorporated by reference in their entirety.

BACKGROUND OF THE INVENTION

Cooling of industrial warehouses and shipping docks, and specifically cooling the inside space of docked trailers, is conventionally done with fans. This is because air conditioning (AC) is too expensive for such poorly insulated spaces where open dock doors allow cold air to escape, swamp coolers require too much space to deliver the required cooling and because orifice-based misting fans tend to clog and/or puddle. Rotating Plate Misting Fan (RPMF) systems too, do not at this time provide enough cooling or are not yet reliable enough to manage return water without causing flooding and do not allow sufficient control of mist volume and humidity while keeping articles in front of the RPMF dry. Thus, virtually every bay door at every large shipper that requires manual loading has wall mounted fans, providing for dangerously little cooling for workers. In fact, according to the Occupational Safety and Health Administration (OSHA), fans should not be used when the ambient temperature exceeds 95° F., because by blowing hot air, fans actually increase the risk of a heat injury. In the sunbelt during hot days, workers often find themselves working inside trailers with temperatures exceeding 90° F. which according to US Military Code is the maximum temperature allowed for physical labor.

SUMMARY OF THE INVENTION

An object of the invention is to overcome deficiencies in prior art systems in order to increase the efficiency of the RPMF, which is defined as the amount of water sprayed by the rotating plate (RP) divided by the amount of water fed onto the RP.

Another object of the invention is to increase the misting capacity of an RPMF system up to five times what is conventionally available. (Typical RPMF systems are capable of misting about 4 gallons per hour for a 13-inch plate. Above that limit, the plates tend to saturate and "spitting" of larger droplets occurs.) Often, where space is limited, as is the case with dock doors, increasing the diameter of the plate to increase the volume of mist is not a practical option due to employee movement and size constraints of the dock door area.

Another object of the invention is to reduce the average size and size distribution of droplets in the mist coming out of an RPMF. The smaller the average size of droplets coming out of the fan the more cooling that can be provided. Too many of the water droplets in a traditional RPMF are above 10 microns making it too heavy to remain suspended in air, and the droplet end up settling on the floor within minutes of operation thereby creating a slip hazard. In embodiments, nearly all mist coming out of the RPMF is sub 10 micrometer thereby allowing no water settlement on the floor even with dramatically more powerful misting.

Another object of the invention is to provide reliable management of excess water return of an RPMF.

Another object of the invention is to provide for autonomously and dynamically adjusting the vapor rate to optimize cooling as a function of proximity to the cooled object, the ambient temperature and humidity, and to allow such control for an independent unit or a fleet, as well as remotely managing a fleet of RPMFs for reliability and performance. RPMF's main disadvantage in cooling, in the present state of development, is increased humidity and consequent wetting of floors and surfaces. These wetting properties are especially concerning in logistics warehouses and trailer cooling, where the wetting of cardboard packaging may make conventional misting fans, including RPMFs, ineffective and potentially detrimental. Therefore, in order to minimize the risk of wetting the parcels, the inventors have focused on management of excess water (so that it does not fly out of the system and wet the floor) as well as providing an autonomous mode which makes the machine self-aware of the conditions surrounding it and governs the amount of mist cooling based on psychrometric parameters, which enables use of RPMF and mist-based cooling in places where wetting is of concern.

In embodiments, the rotating plate as well as many other components of an RPMF according to the invention have been contoured and surface treated to prevent large droplets of water flying off the RPMF.

In one embodiment, an RPMF according to the invention comprises: a water supply; at least one rotating plate and a housing receiving the plate; each said plate having a front misting surface and a rear surface facing a spinning hub; said hub being mounted on a shaft having a longitudinal axis, said hub having exterior surfaces including a rear and lateral sides; wherein water is supplied from the water supply to the spinning hub and to the rear surface of the rotating plate, and wherein the rotating plate is provided with a contour composed of concentrically arranged planar surfaces, said planar surfaces being generally perpendicular to the longitudinal axis of the shaft, a plurality of said planar surfaces being at a respective plurality of different positions on the longitudinal axis of the shaft.

In embodiments, the concentric planar surfaces are arranged so that when the rotating plate is placed stationary on a flat horizontal surface and water is poured on the front misting surface, water cannot pool on the plate.

In embodiments, water is supplied to the hub on the RPMF in a controlled way to avoid water losses and to minimize uneven distribution of water onto the surface of the rotating plate.

In an embodiment, an RPMF according to the invention comprises: a water supply; at least one rotating plate and a housing receiving the plate; each said plate having a front misting surface and a rear surface facing a spinning hub; said hub being mounted on a shaft having a longitudinal axis, and having at least exterior surfaces including rear and lateral sides; and at least one water conduit directing water from the water supply onto the exterior lateral surfaces of the hub, wherein the water conduit does not eject water directly onto the rear surface of the plate or directly onto the hub at a 12 o'clock position of the hub.

In another embodiment, the at least one water conduit directs water from the water supply onto the lateral side exterior surface of the hub so that the water is incident on the hub at a position that is between 2 o'clock and 10 o'clock when looking at the RPMF from the front, (into the mist) (+60 to −240 degrees with respect to the horizon, wherein the horizon is at 0 degrees and a positive angle is formed with the horizon in the clockwise direction).

In embodiments, water is provided onto the surface of the hub with a velocity component in the direction the hub is spinning.

In embodiments, alignment and weighting of the hub is improved by having a hole in the rotating plate receiving the hub, wherein a diameter of a hole receiving the hub is 15% or more of the diameter of the plate. The plate in such embodiments may be described as "self-aligning," due to the plate being thin and lightweight in comparison to the hub.

In another aspect of the invention, water loss is addressed by optimizing design and conditions at the periphery of the plate of the RPMF.

In embodiments, an RPMF is provided, comprising: a water supply; at least one rotating plate and a housing receiving the plate; said at least one plate having a front misting surface and a rear surface facing a spinning hub; said hub being mounted on a shaft and received in a hole in the center of the plate. The RPMF is provided with a flat surface positioned behind the rotating plate, starting behind the plate and extending outward of a peripheral edge of the rotating plate in a radial direction.

In embodiments, the flat surface is more than 0.5 and less than 5 mm behind the peripheral edge of the rotating plate and may be provided as a ring attached to the housing. In embodiments, the ring may be provided with deflecting teeth for contacting and atomizing water droplets ejected from the plate. In embodiments, the teeth are provided at an angle greater than 0° with respect to a radial of the rotating plate.

Careful scrutiny has been given to every surface of an RPMF that contacts water and novel systems have been introduced to minimize water loss and to enhance water collection and recycling as described in the detailed description below.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
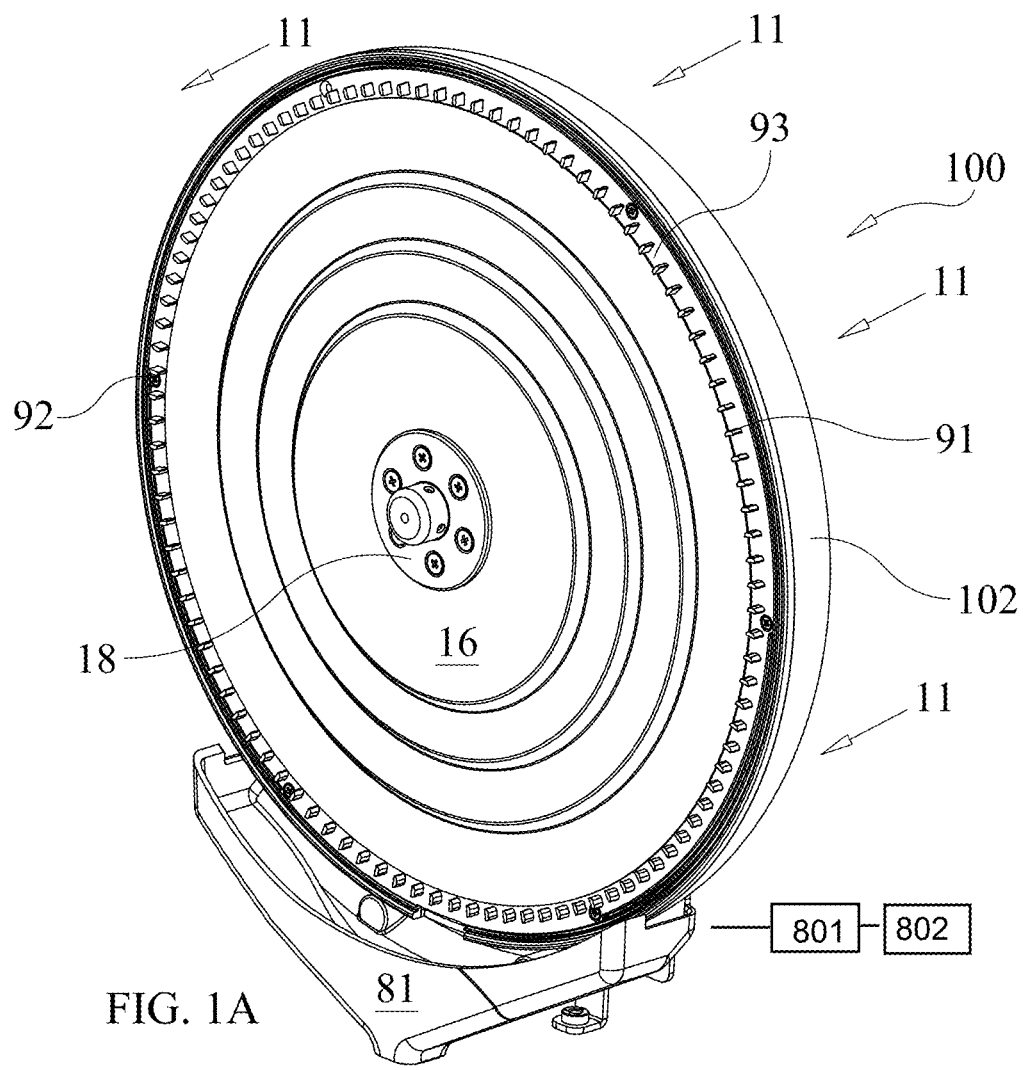
FIG. 1A depicts a front perspective view of an RP assembly according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other non-transitory information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1B:
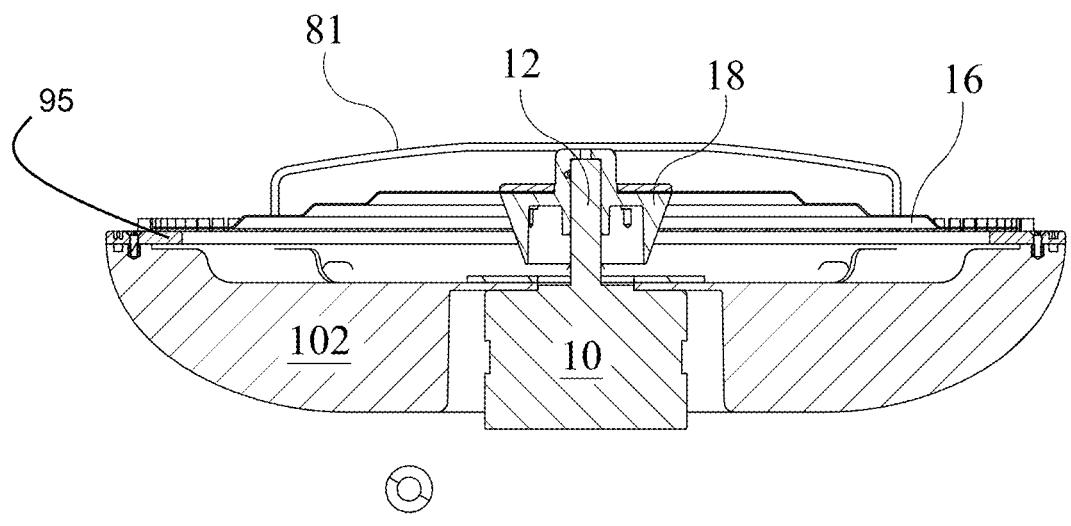
FIG. 1B is a cross sectional view of an RP assembly.
Figure 2:
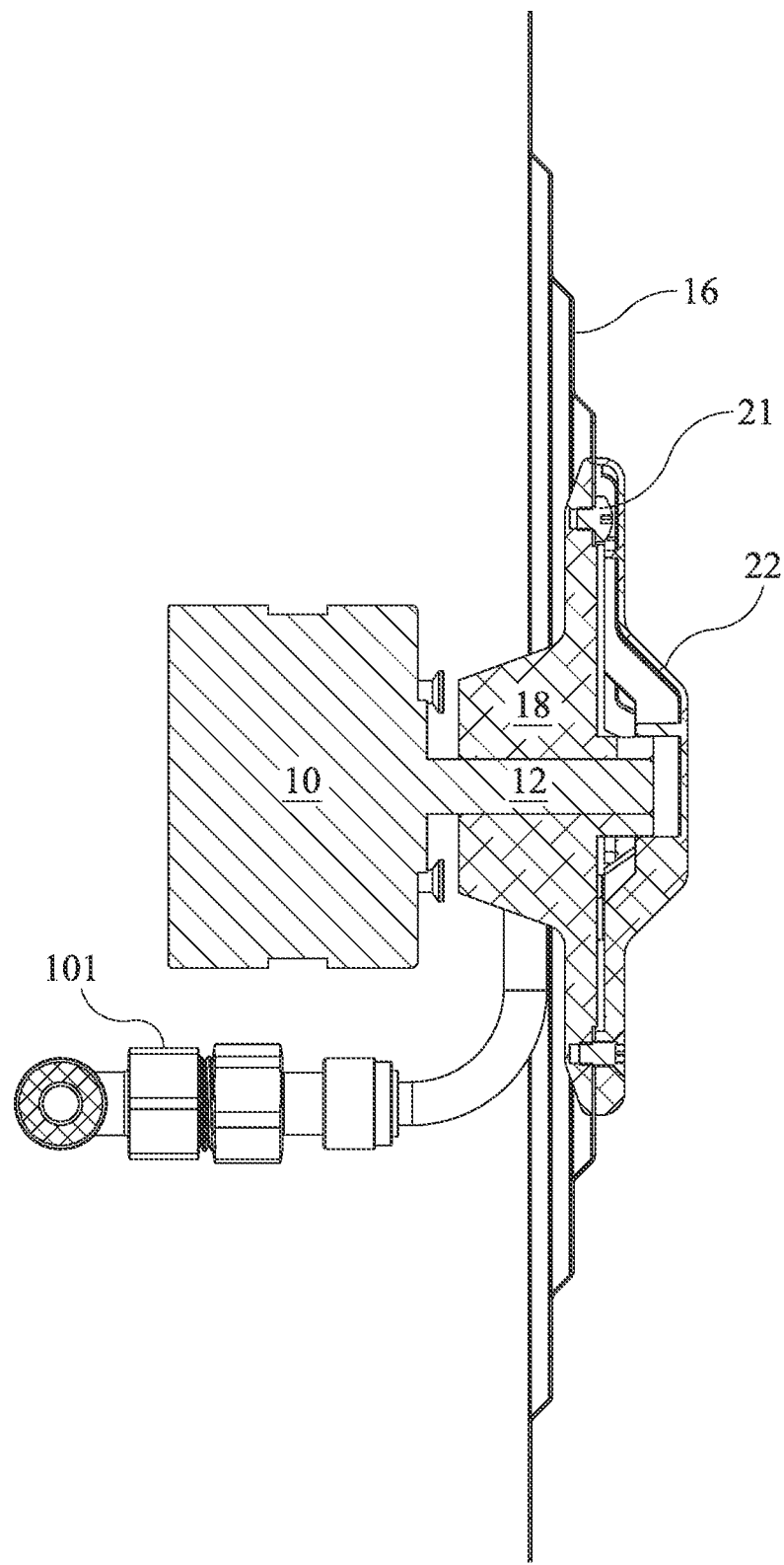
FIG. 2 is another cross-sectional view of an RP assembly according to an embodiment of the invention, omitting the RP housing.
Figure 2A:
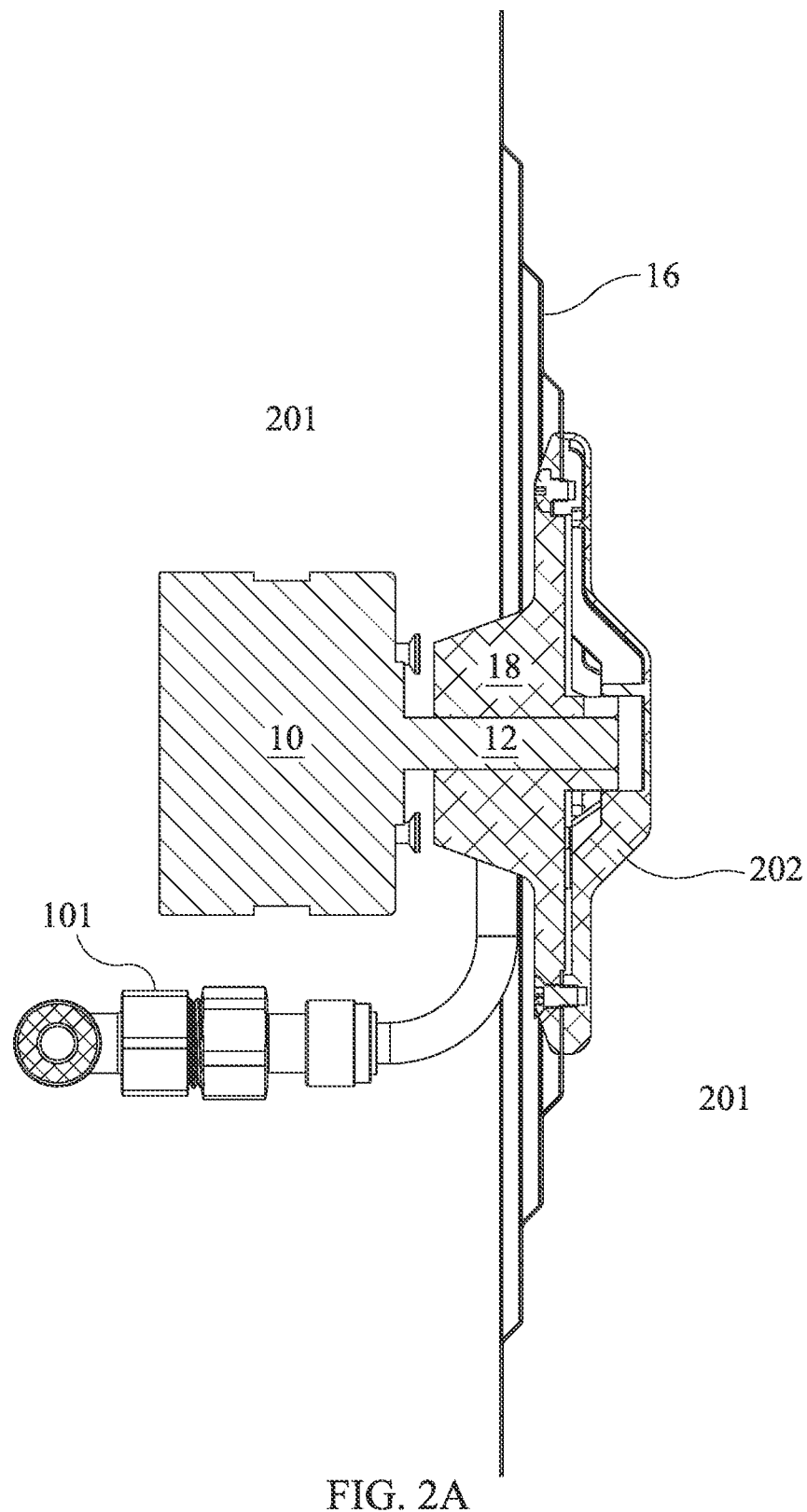
FIG. 2A depicts an alternative arrangement for fastening a hub to a rotating plate, incorporating a secondary bushing according to an embodiment of the invention.
Figure 3B:
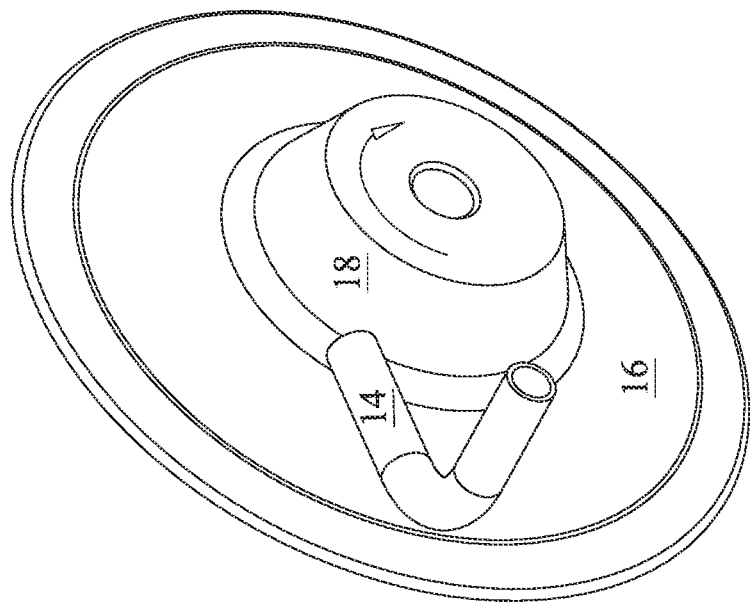
FIGS. 3A and 3B schematically depict water supply onto an external surface of the hub according to an embodiment of the invention.
Figure 3A:
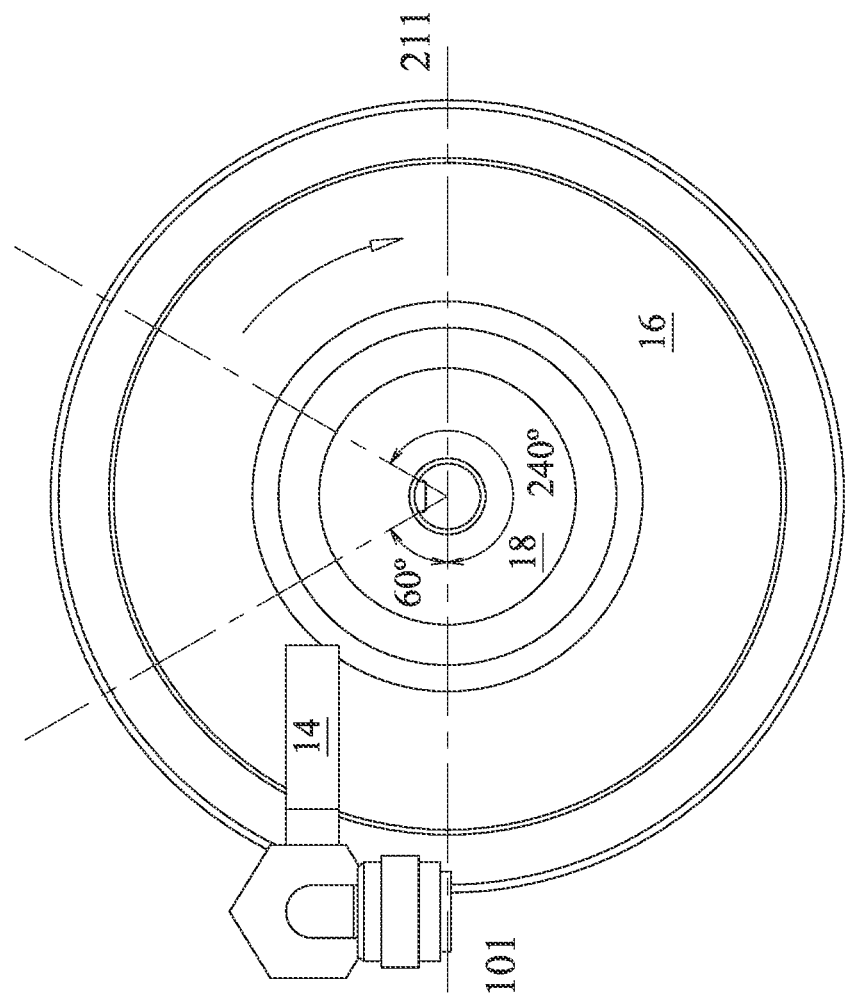
Figure 4:
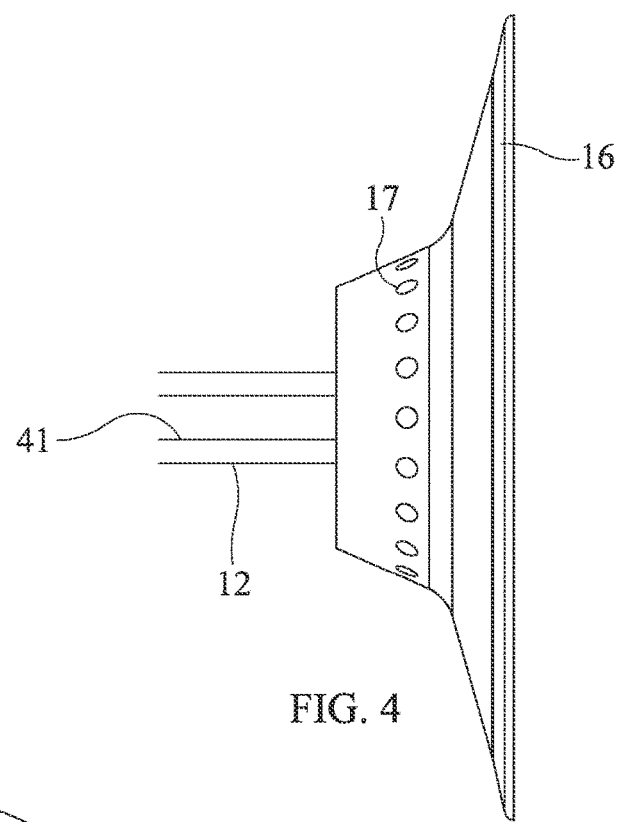
FIG. 4 schematically depicts water supply onto an internal surface of the hub according to an embodiment of the invention.

A rotating plate assembly 100 is depicted schematically in FIGS. 1A and 1n cross section in FIG. 1B, comprising at least one rotating plate 16 mounted on shaft 12 driven by motor 10, and hub 18 connected to plate 16. Rotating plate 16 is mounted for rotation in housing 102. The assembly includes water supply 101 (depicted in FIG. 2), through which water is provided to hub 18 and/or rear side of plate 16. Water makes its way along the outer surface of hub 18 and centrifugal force from the rotation of hub 18 and plate 16 forces tracks of water or "ligaments" to the edge of the plate where droplets of mist are expelled between plate 16 and housing 102 in which the rotating plate is mounted. Careful observation and testing of these phenomena have resulted in certain innovations in design.

An RPMF comprises a fan (not shown) which is located behind a rotating plate assembly and may be attached to the rotating plate assembly. The details of RP assembly 100 are described independently of the fan, though it is understood by those of the skill in the art that a fan is generally part of the overall apparatus, blowing the mist forward. Airflow direction is indicated by arrows 11.

In a conventional RPMF a water stream is projected directly on the "wet side" of a rotating plate or may be splashed on the top side of an outer surface of the spinning hub, directly above the hub, including at the "12 o'clock" position. According to embodiments of the invention, schematically depicted in FIGS. 3A and 3B, water may be projected from water conduit 14 onto an outer surface of hub 18 in a direction hub 18 is spinning.

Another aspect of improved water supply to the plate of the RPMF according to embodiments of the invention is depicted in FIG. 3A, wherein water from water supply 101 is conveyed onto a lateral surface of the spinning hub 18 in a direction parallel to rotation of the rotating plate so that the water flow hitting the hub and/or plate is already parallel to and flowing in the direction of the rotation, which again minimizes spatter and waste of water. In embodiments, water is not directed at the top of the hub but is instead incident on the hub at a position that is between 2 and 10 o'clock. Thus, water from conduit 14 is preferably incident on the hub at an angle no greater than 60 degrees with respect to the midline, and may be incident at any position from 60 degrees, below the midline, and up to −240 degrees on the opposite side.

In embodiments, water flow onto the plate is improved by angling water incident on hub 18. Hub 18 is circular and has a circumference. Instead of directing water onto hub 18 in a direction parallel to the circumference, water may be projected at a slight angle toward rotating plate 16. These adjustments cause the water to flow smoothly onto plate 16 and from hub 18 to the peripheral edge of the plate where it is ejected as mist.

In another aspect of the invention, water may be provided onto hub 18 or plate 16 from more than a single direction with more than a single source, e.g., with multiple conduits 14. In embodiments, applying water onto the hub or the plate at multiple positions may increase the amount of water the RP can distribute.

In embodiments, when projecting water on the hub at a plurality of positions on the hub, water is directed onto the hub above a horizontal midline of the hub and sufficiently inboard of the lateral sides of the hub to prevent water from dropping between the hub and the openings of the water conduits, whether a single water conduit or a plurality of water conduits projects water onto an exterior surface of the hub.

In another embodiment, schematically depicted in FIG. 4, water is directed through conduit 41 inside shaft 12 to an inside surface of hub 18, and reaches rear surface of plate 16 through openings 17 in hub 18, which may increase uniformity of water flow and improve mist formation. When water is projected on inner surface of hub 18, water first coats the inner walls of the hub and only then is sprayed onto the plate through dedicated openings 17. This allows water to coat the plate in a uniform manner, increasing the efficiency of misting.

Adding a second plate on shaft 12 may allow for increased misting. This may further be generalized to three, four, or more plates, fed from one or a plurality of hubs.

In an embodiment depicted in FIG. 2, fasteners 21 for hub 18 are provided on dry side of plate 16 and protected by cover 22. In an embodiment depicted in FIG. 2A, fasteners 201 may be provided through wet side of plate 16 and received in a secondary bushing 202, to avoid having protrusions on the dry side of plate 16. The cover 22 or secondary bushing 23 further act as a clamp for the thin RP aiding it to straighten and lock in place simply from the action of rotating plate 16 on shaft 12, without requiring dynamic balancing, thereby dramatically reducing production costs without impeding performance.

FIG. 5A and FIG. 5B depict an RP according to embodiments of the invention wherein RP 16 is contoured, having a plurality of concentric planar surfaces or "treads" 71 at different positions on longitudinal axis 15 of shaft 12. In embodiments, each tread 71 is substantially perpendicular to a longitudinal axis 15 of shaft 12 separated from an adjacent tread 71 by riser 72, so that peaks and valleys are not formed on the plate, as is sometimes practiced in the art. Substantially perpendicular, in this context, means less than 10 degrees from perpendicular, and in embodiments, less than 5 degrees from perpendicular.

Treads 71, separated by risers 72, form steps that interrupt travel of ligaments of water on the "wet" side of plate 16 traversing plate 16 toward its peripheral edge. Having treads 71 in a perpendicular relationship with the longitudinal axis of the shaft, prevents water droplets from dislodging from the peaks between treads as a result of centrifugal force created by rotation of plate 16. In a case where the rotating plate approximates a dome, which is conventional, water does not meet "steps" at all, such that the breakup of the water into finer and finer ligaments occurs at a lower rate. In an embodiment shown in FIG. 5B, each of the planes 71 forms about a 90° angle with the longitudinal axis 15 of the shaft. It may also be advantageous to control an angle made by risers 72 with the longitudinal axis. In embodiments, no plane 71, 72 on back side of rotating plate 16 is at an angle $\alpha$ greater than 100 degrees, measured between a shaft of the hub and any plane on the surface of the plate.

The rotating plate assembly according to embodiments of the invention has at least 60% of the rotating plate's surface perpendicular to the shaft centerline (±10 degrees). In embodiments, the treads themselves are parallel to each other, each adjacent plate tread diverging less than 10 degrees from parallel relationship with its neighbor (and in embodiments less than 5 degrees). In embodiments, the parallel, or near-parallel treads are separated by risers 72, which may be curved or straight, and may be perpendicular or nearly perpendicular with the plane of the tread. In embodiments, the risers may be shorter than 1 centimeter. The risers may be at an angle close to 90 degrees with the tread, such that when water climbs a riser and then turns 90 degrees along the tread surface (on the rear side of the plate), the water ligaments split into finer ligaments as they travel toward the plate periphery. The risers need not be straight; they can be inclined, rounded, or any other configuration, without departing from the scope of the invention. These features can be measured according to a "Tread Test" simply by placing a rotating plate flat and stationary, pouring water from above over the entire front surface of the plate. If some of the water is captured into concentric pools on the surface, then the Tread Test is "failed". If no concentric rings of water pool on the surface of the plate in the Tread Test, the Tread Test is "passed." According to embodiments of the invention the rotating plate has treads rather than peaks and valleys and passes the Tread Test.

Figure 5A:
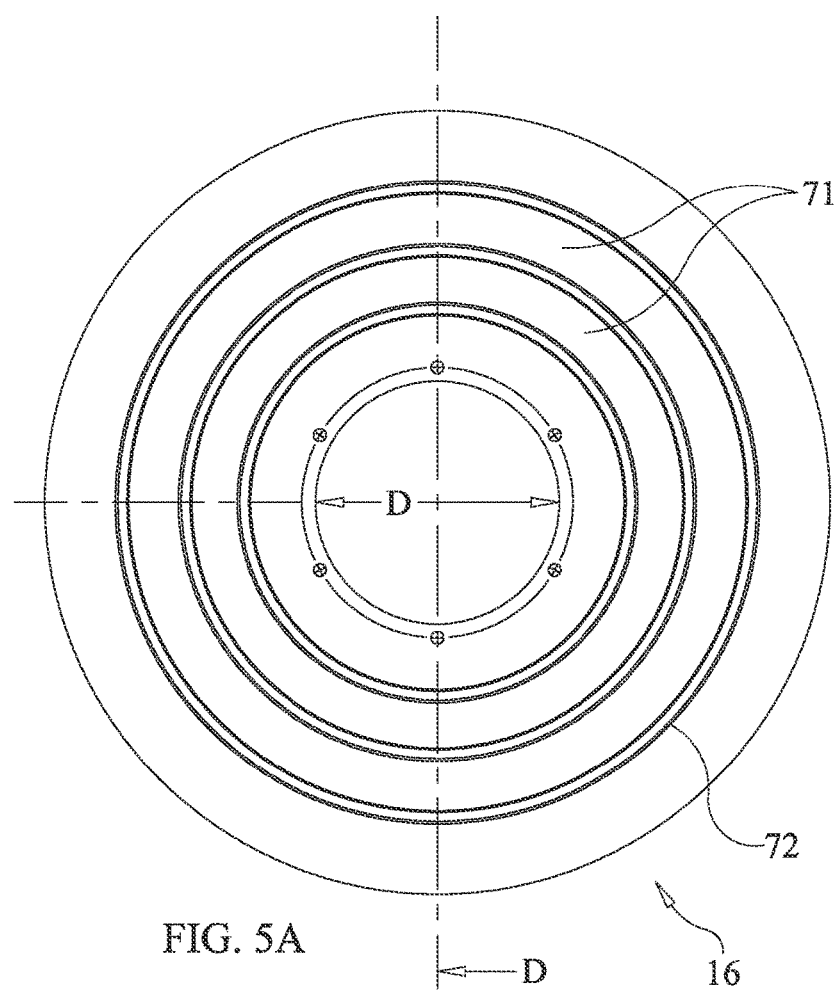
FIG. 5A is a front view of a rotating plate and FIG. 5B is a cross section thereof, depicting concentric planes or "treads" according to an embodiment of the invention.
Figure 5B:
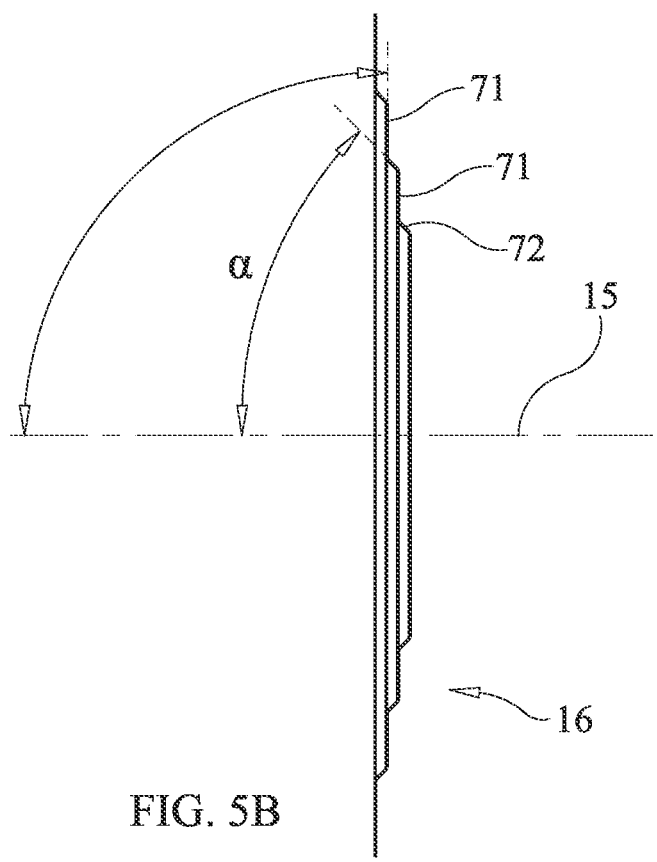

The RP is thin and flexible and self-aligns at a predetermined rotation speed. As shown in FIG. 5A, the rotating plate has a central hole accommodating the hub and a ratio of a diameter D of the central hole to a diameter of the plate is higher than 15%. Conventionally, it was thought to manufacture hubs as small as possible in order to reduce the weight of the rotating assembly and allow for smaller motors; this conventionally also required a rotation and a balancing apparatus similar to what is done with car wheels adding or reducing weight to the plate at one or another radial. The inventors herein have surprisingly found that a larger hub-to-plate diameter ratio, sacrificing functional area of the plate, enables use of a thin plate that does not need to be dynamically balanced. That is, the plate stretches and self-balances as a result of centrifugal forces, due to an increased weight and size of the hub, as well as the flexibility of the plate.

The materials of construction of an RPMF according to the invention are similar to what is used in the prior art. The rotating plate is typically (but not necessarily) metal, such as stainless steel, and may be somewhat thinner than a plate material on a conventional RPMF. The housing and associated parts, including a drain, where applicable, and a detachable ring with "teeth" (discussed below) may be made of molded plastic or steel (but this is not a requirement). Where a surface is indicated as being hydrophilic, this may be done by selecting an appropriately hydrophilic plastic for molding, or applying a surface coating, or applying a rough grainy texture as would be apparent to the person having ordinary skill in the art. Often in the prior art, all parts that come in contact with the water (hub, plate, teeth, housing, drain) are smooth and hydrophobic such that agglomeration of water droplets on the surfaces is clearly visible. In contrast, in embodiments according to the invention, plastic water-contacting surfaces are hydrophilic, for example, causing water droplets to form a contact angle of 30 degrees or less.

Figure 6:
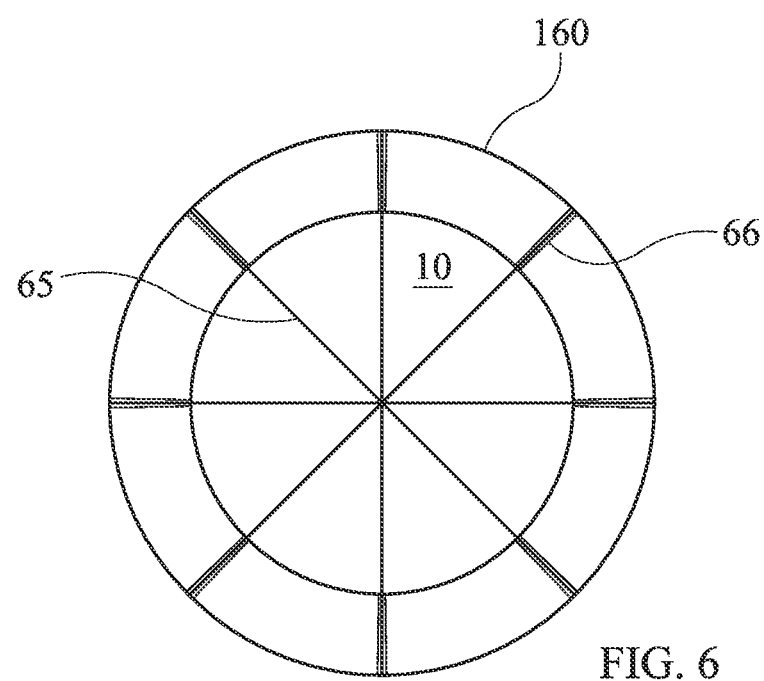
FIG. 6 schematically depicts a configuration of grooves provided on the wet side of an RP to guide fine ligaments of water to a peripheral edge of the plate.
Figure 7:
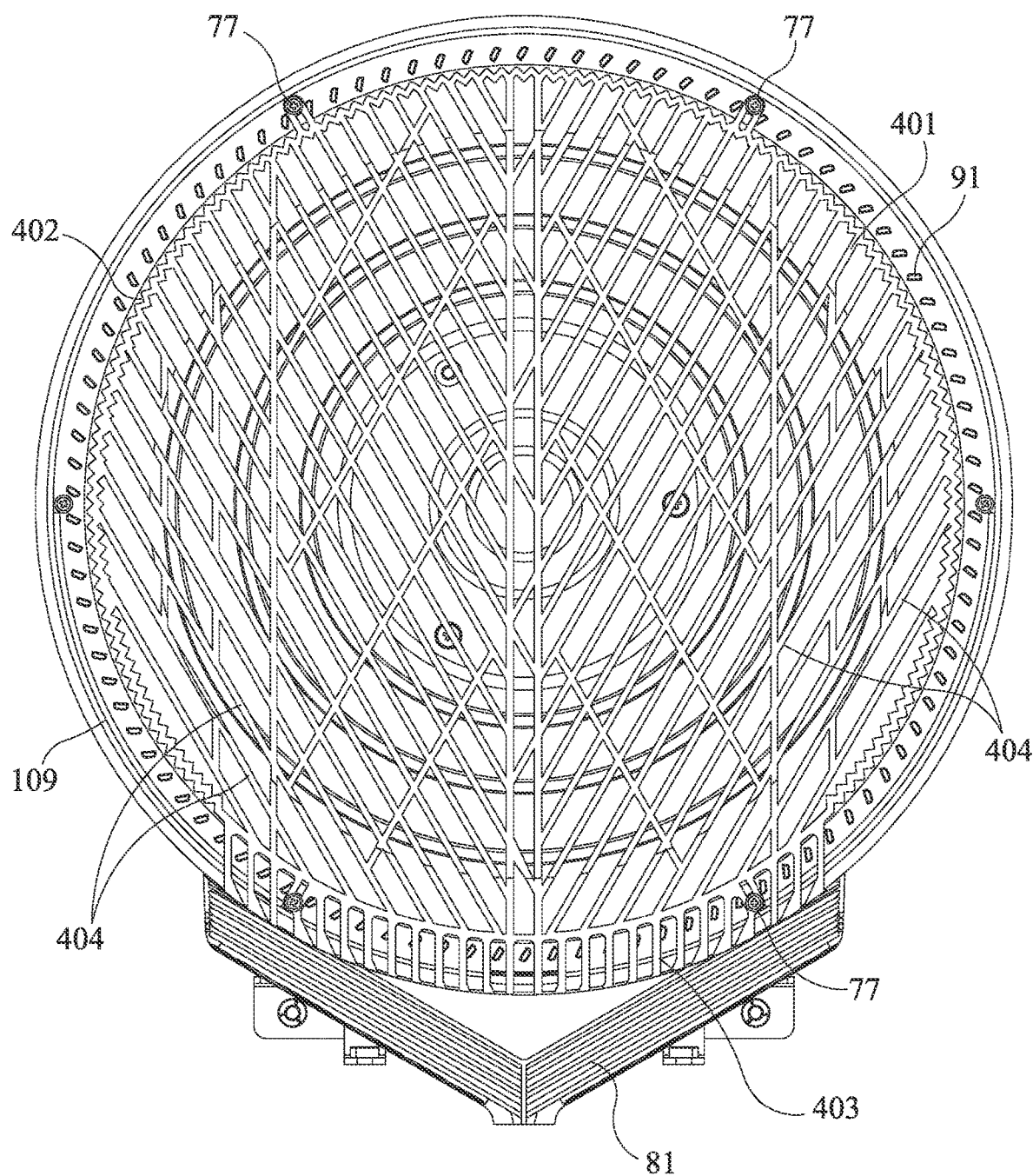
FIG. 7 depicts a guard screen for an RP assembly according to embodiments of the invention.

In an embodiment schematically depicted in FIG. 6, grooves 65, 66 may be provided on the wet side of plate 16 along the radials of the plate. As shown in FIG. 6, the number of such grooves, the overall density of grooves, may increase in a direction toward a periphery 160 of plate 16 the farther the grooves are from the hub. Thus, a water ligament traversing the wet side of the plate from hub 18 toward periphery 160 will be guided along groove 65, and may be divided into finer ligaments by additional, more densely-spaced grooves 66.

It is conventional in the art to encase the periphery of the plate with a shield as a last stop for droplets of water flying off the plate. This results in the housing having an edge surface that extends forward of the rotating plate. The drawback of this encapsulation at the periphery of the plate is that it may lower the volume of mist coming out of the plate by capturing some of the mist and returning it to the drain. In embodiments of the invention, by improving the plate contour and the delivery of water to the plate, as described above, the excess droplets are eliminated and a shield not only becomes redundant, but the negative impact can be avoided whereby, in a conventional application, the shield agglomerates water which then drips into the air-stream and wets the floor. As seen in the cross section of FIG. 1B for example, no protruding edge surface is provided and no portion of perimeter 102 of housing is forward of the plate, defined as protruding less than 0.5 cm in front of the plate, and in embodiments less than 0.1 cm in front of the plate. The housing is substantially flush with the peripheral edge of the front misting surface of the plate and no mist-catching shield is provided.

In some embodiments, the RP may be provided without a screen. However, in an embodiment depicted in FIG. 7, RP assembly 100 is provided with guard screen 401 which for reasons of user safety prevents contact with plate 16. Novel features of guard screen 401 improve water collection, including guides 404 inclining downward toward drain to form a chevron-shape with adjacent guides. Guides 404 may meet at an angle from 100-30°, for example 60° to form a chevron shape. In embodiments, water does not contact horizontal surfaces on the guard screen at any point and is not able to collect. Guard screen 401 may include crown portion 402 on its perimeter and a beard feature 403 on a lower portion which also serve to direct water to drain 81. In the embodiment shown, four fasteners 77 attach guard 401 to housing 102, and they are not spaced equidistantly around the perimeter of the RP.

The detail of FIG. 9 depicts trenches 109 introduced along the surface of the housing beyond the periphery of rotating plate 16. Trenches 109 collect and direct wetting of the surface to channel water to drain 81 making use of capillary effects to guide water. To improve collection of water, surfaces of the drain likewise may be provided with channels to ensure water does not drip from the device. These surfaces (and any surfaces associated with the housing that accumulate water) may be made of hydrophilic polymeric material or treated, such as by adding a grainy texture to become hydrophilic.

In another aspect, the invention includes "teeth" structures 91 that may be provided at the periphery of the plate to improve misting capability. Teeth 91 serve to break up water droplets expelled from plate 16 to further facilitate mist creation. In embodiments, teeth 91 have an orientation, for example a generally elongated shape, wherein the longitudinal axis may be angled with respect to a radial line extending from the center to the circumference of the plate. The longitudinal axis may be pitched at an angle 5-45° or more with respect to a radial line, as shown in FIG. 7.

In embodiments, sets of teeth may be molded integrally with the housing. In other embodiments, arcuate sets, such as rings, of teeth may be provided for interchangeable attachment to the housing, adapted to adjust a tooth count or an arrangement of teeth by swapping out rings. Two or more of the sets of teeth may be used in combination, forming an interwoven pattern. In embodiments, sets of these teeth are provided to change the density of teeth provided proximate the edge of the rotating plate. Different rings may change the angle at which the teeth are positioned with respect to the radial, the density of teeth or the shape of the teeth may be changed, making them more elongated or shorter, depending on the anticipated volume flow. As shown in FIG. 11 and FIG. 1A, teeth 91 may be provided on a ring 93 which is removably attached to housing 102 by fasteners 92.

As shown in FIG. 1A and FIG. 1B, a set of teeth may be provided on an arcuate support, such as ring 93. A flat portion 95 of ring 93 may extend inwardly of the teeth in a direction of the center of the rotating plate, positioned behind the "wet" or rear side of the rotating plate behind the plate a distance of about 5 mm or less, to reduce water loss. The surface may extend toward the center. This surface may be small compared to the extent of the plate. This flat extension advantageously extends on the ring inwardly of the teeth. However, a backstop surface in this area may be provided without the teeth and may be provided as part of the housing. As discussed above, misting is enhanced if in addition to the teeth, capillary trenches 109 are provided near the gap between the plate and the housing, returning stray water that does not form mist to drain 81.

Figure 8B:
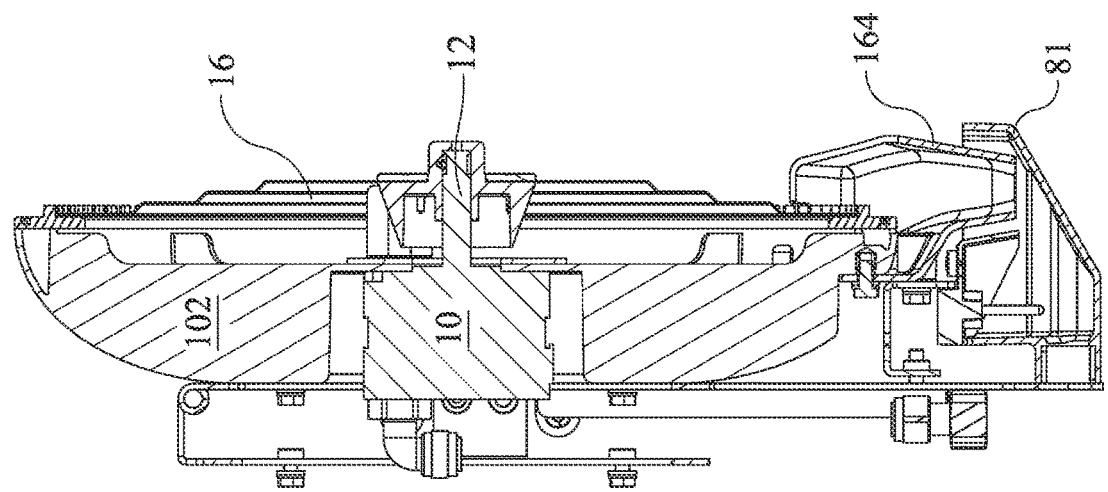
FIG. 8B is a cross sectional view thereof.
Figure 8A:
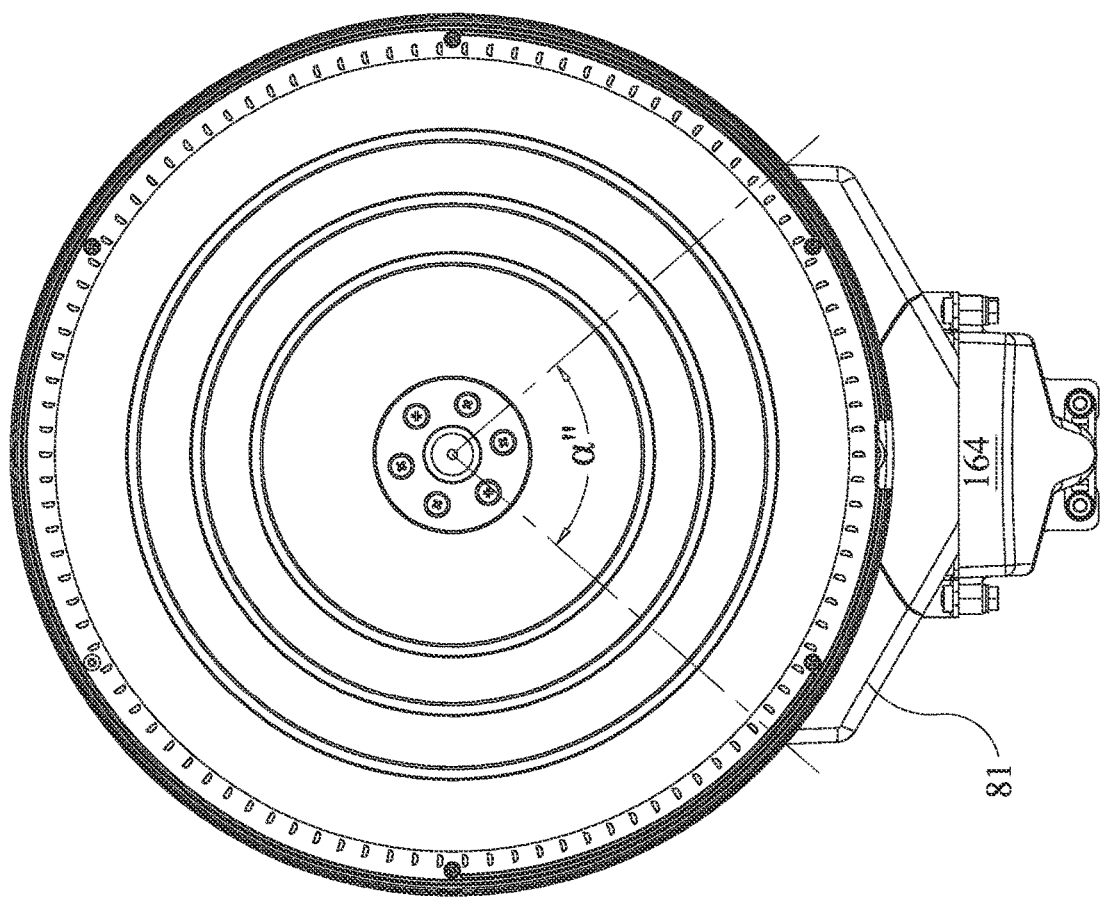
FIG. 8A depicts a front elevation view of an RPMF having a drainage arrangement, according to an embodiment of the invention
Figure 9:
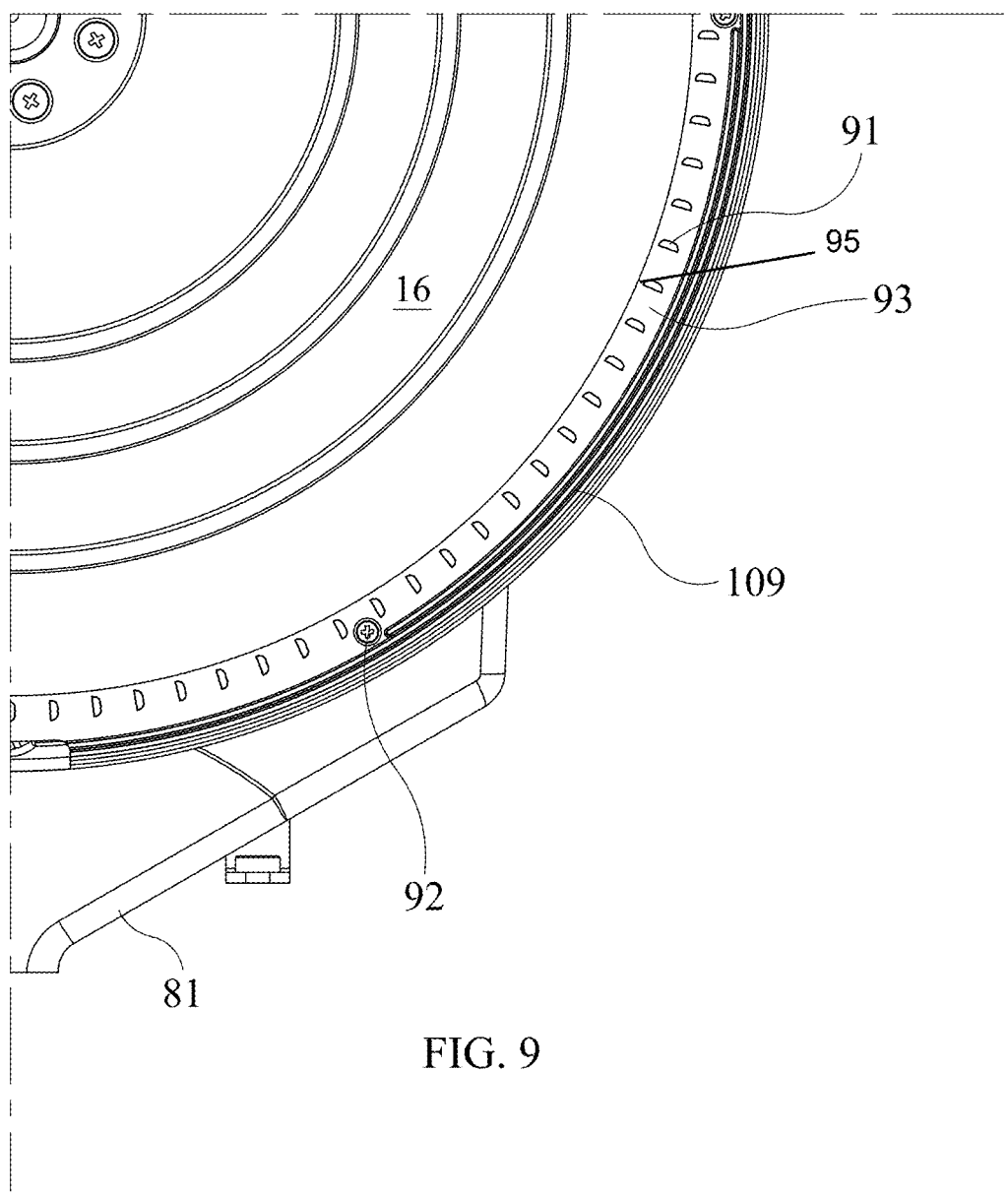
FIG. 9 is a detail view of an area adjacent to the perimeter of the rotating plate, according to an embodiment of the invention.
Figure 11:
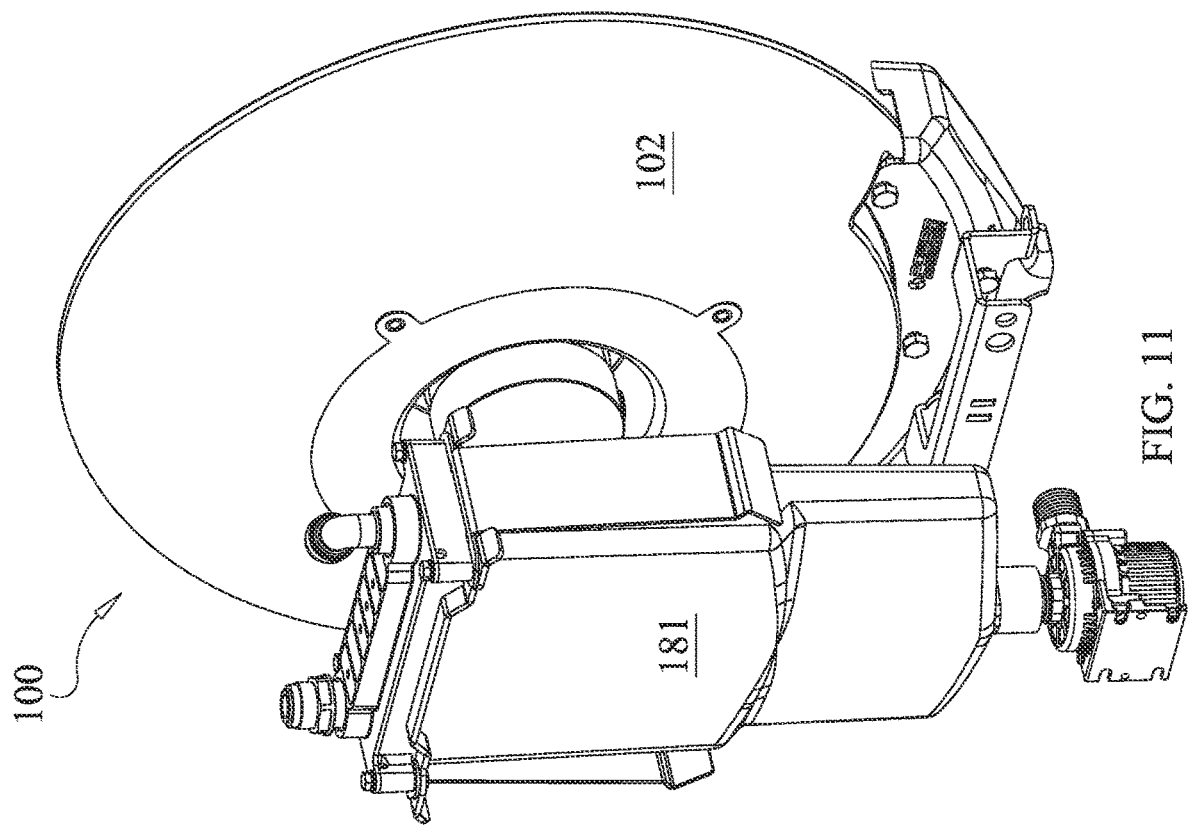
FIG. 11 is a rear perspective view of an RP assembly according to an embodiment of the invention, incorporating an intermediate water tank.
Figure 10:
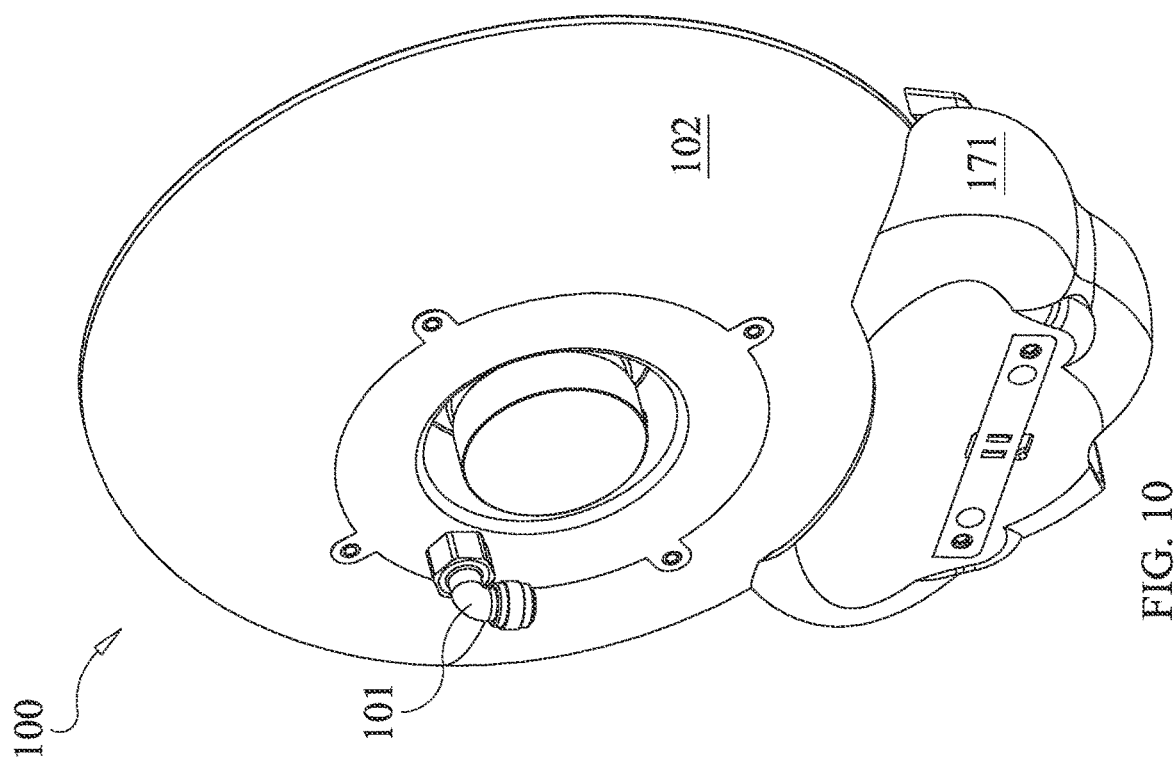
FIG. 10 is a rear perspective view of an RP assembly according to an embodiment of the invention, incorporating a windshield for the drain.
Figure 12A:
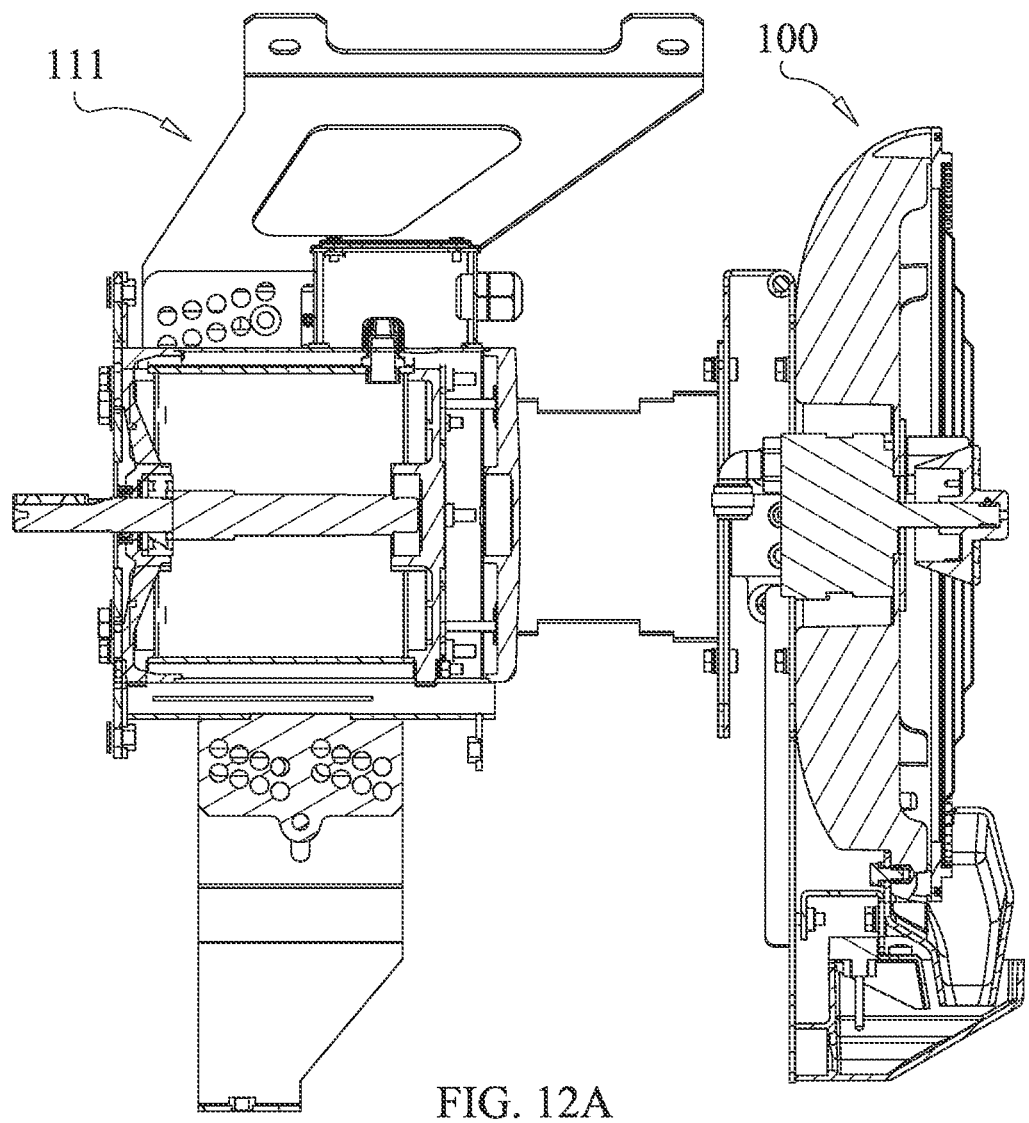
FIG. 12A and FIG. 12B depict a rotating plate assembly mounted on a frame to facilitate installation at different heights.
Figure 12B:
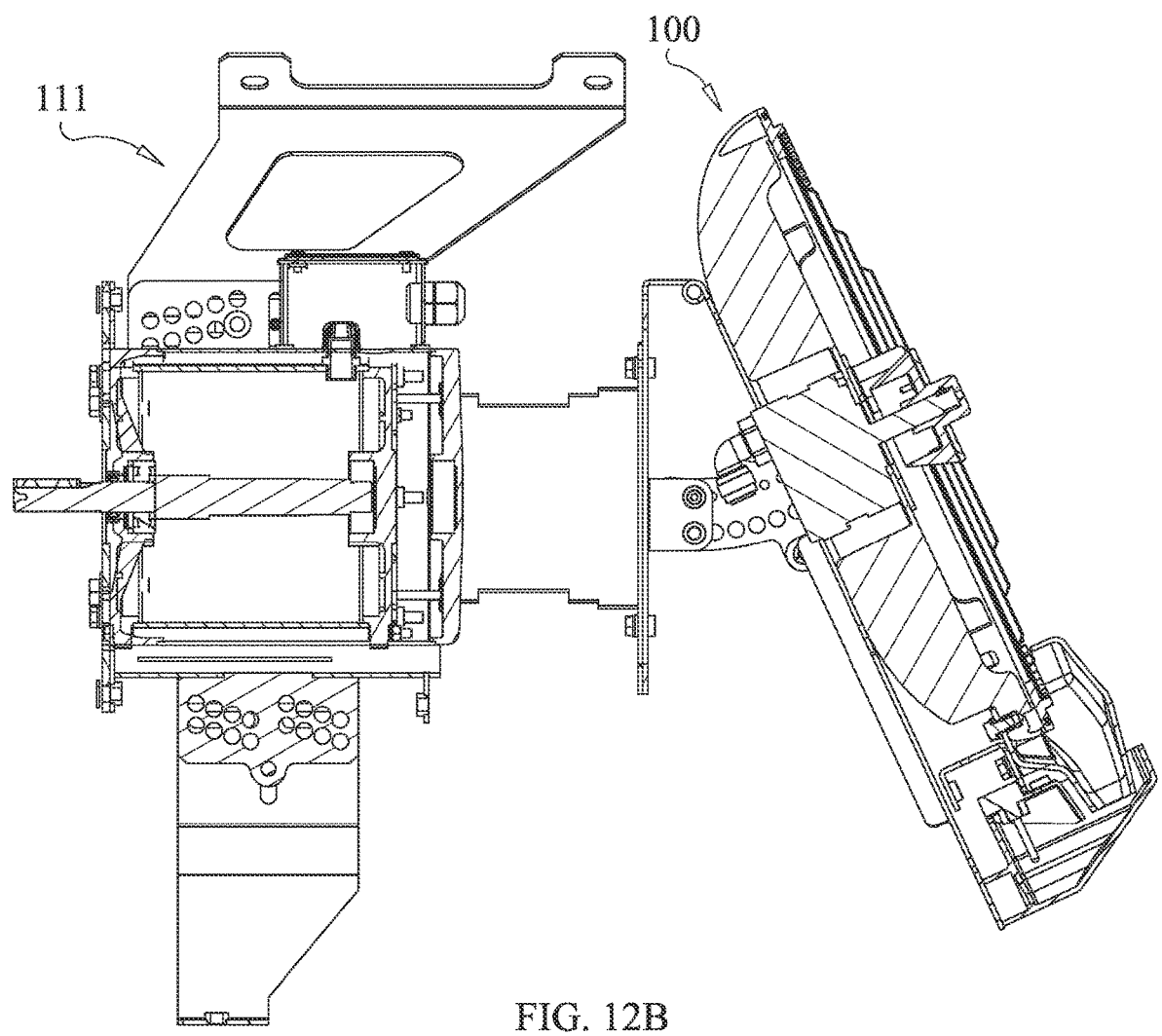

The misting action is not completely efficient and not all the water that is projected on the plate converts to mist. Some water will drop by gravitation and drain 81 may be required for an RPMF to operate efficiently. A drain arrangement is shown in FIG. 8A and in the cross section of FIG. 8B. Improvements to RPMF efficiency and droplet size have allowed a reduction in the size of drain 81 located at the bottom of the RP assembly. In embodiments, the sides of drain 81 make a drain angle of less than 110° with the center of the RP (the "drain angle" a' being measured from the center of the RP to opposite sides of drain 81 as shown in FIG. 8A). In embodiments, the drain angle encompasses an arc of 110° or less, and in embodiments, 100° or less.

Referring now to FIG. 8A, a smaller drain 81 allows for more mist to come out of the RPMF without forming droplets because drain surfaces on which droplets can form are reduced. Every surface forward of the rotating plate perpendicular to the flow of the air will over time allow mist to condense and drop water into the air flow. To reduce or eliminate this phenomenon, the outer surfaces of the drain are allowed to drain into a smaller drain or "shroud" 164 that has a much lower condensation profile. As shown in FIG. 8A and FIG. 8B, shroud 164 is advantageously provided to collect water that might collect on the outside of the drain. In fact, conventional wisdom is to attempt to reduce wetting of the drain. In contrast, the inventors herein allow wetting of the drain, and provide not only a hydrophilic surface for the drain, but also trenches on the exterior surface of the drain suffice to leverage capillary effects and channel any excess water to shroud 164 and then to drain 81. Shroud 164 may be vertically separated by a minimum of 1 millimeter to not interfere with the water flowing down the drain. If too small a gap is provided, water may make hop out of the trench and drop onto the outer surface of the shroud In embodiments a conventional drain, having a gutter, typically spanning from 4 to 8 o'clock at the front edge of the housing in front of the RP plane with a funnel-shaped guide at 6 o'clock, is avoided altogether. Instead, the drain may consist of one or more holes positioned along the trenches with an aperture at 6 o'clock, siphoning the water into a drain that may be a molded integral part of the housing and located behind the RP plane. In embodiments, a drain is provided as an integral part of the housing and no portion of the drain is forward of RP 16.

As shown in FIG. 10, to prevent water that condenses on the outer surfaces of the drain from dropping into the airflow and flying out of the machine, an aerodynamic windshield 171 may be introduced at the rear of the RPMF assembly.

To minimize the size of the apparatus in the immediate vicinity of the RPMF, water may be recycled to a tank 181 that is mounted behind and in effect hidden behind the rotating plate, as shown in FIG. 11. Since the tank is located above the drain, a pump is required at the bottom of the drain to suck the water from the drain to the tank. In order to avoid flooding of the system, water on the floor below the RPMF and a slip hazard both the shroud and the tank itself are equipped with an overflow protection.

An RPMF may be mounted onto a frame near a trailer docking bay, each RPMF associated with a fan and a rotating plate assembly and positioned on the frame to optimize worker eye level cooling. The RP must remain near vertical to provide proper misting. FIGS. 12A and 12B illustrate how attachment of the RP assembly 100 to frame 111 may be configured to alter the height of the RPMF while keeping the rotating plate near vertical.

In another aspect of the invention, an RPMF is provided with a variety of sensors and related controls to maintain or optimize operation. The RPMF may be connected, such as by Wifi or Bluetooth, to a remote control unit on site or in the "cloud." While fixed indoor climate control systems already allow a significant degree of remote control, and off-site or remote management, monitoring and control of portable climate-control equipment has not generally been implemented. Thus, an additional object of the invention is to realize benefits that pertain to safety and cost through remote control of an RPMF, or a fleet of RPMFs. Advantages of a WiFi or Bluetooth linking of RPMFs may include remote troubleshooting, allowing customer service to connect to the equipment in the field and assess components' operating parameters; automatic collaboration of a plurality of equipment installations in one geographical area based on, for example, environmental patterns; geofencing, allowing programmable parameters for the operation of the equipment even when off site, such as performance limits, regional limits or time limits. These features are of high importance for equipment rental companies seeking to increase customer ease of use. Centralized monitoring may allow an officer in charge to verify proper operation, such as remotely verifying when an RPMF runs out of water; and may allow plant managers to compare productivity levels to cooling parameters.

In embodiments, the RPMF further comprises a range sensor 801 and a controller 802 adapted to automatically adjust vapor rates and/or fan speed, based on an assessment of objects in front of the misting fan and or psychrometric parameters. These parameters may be monitored and controlled for a single RPMF or for a fleet.

Object sensors associated with an RPMF, or with a plurality of RPMFs in a fleet, may be configured to identify the presence of objects on a vector and rate of progress along said vector.

Sensors, such as distance, humidity, temperature, and pressure sensors, may be placed proximate the RPMF, or in a location being cooled by the RPMF (such as a truck trailer or loading bay), communicating wirelessly with the RPMF, and with a controller to adjust water and fan levels according to the distance to the "target" and psychrometric calculations to adjust the wind and water levels. Appropriate sensor and control schemes may be provided for auto drying, that is, removal of all (or most) of water from the machine's tanks, and anti flood controls—sensors that monitor if the water system is flooding or leaking.

Sensors associated with an RPMF, or with a plurality of RPMFs in a fleet, may be configured to identify malfunctions including lack of water in the water reservoir, electrical disconnects and high current draws and GPS location.

Sensors associated with an RPMF, or with a plurality of RPMFs in a fleet, may be configured to increase the systems awareness to threats and automatically remove it in or out of the way responding to forklifts and people moving in or out of the target cooling zone.

Sensors associated with an RPMF, or with a plurality of RPMFs in a fleet, may be configured to identify the presence of people outside the system's cooling zone and order the system to oscillate and change its orientation automatically pointing at where people are as they move through the space.

Sensors associated with an RPMF, or with a plurality of RPMFs in a fleet, may be configured to identify productivity rates of operations within the range of the sensors, movement or lack of thereby enhancing safety and optimizing cooling and energy consumption for peoples' presence or productivity rates.

The RMPF or a fleet may be used with a computer application configured to allow control of the fan by a user and for communicating with a management system of the fan. An application of this type may be configured to connect a user by phone or video via the application to the management system for customer service. Remote control may include the ability to remotely lock the fan's physical control board and allow remote operation and firmware updates only as well as to automatically alert a user or a management system of any other malfunction.

The following additional recitations are provided for a complete understanding of the invention:

A rotating plate misting fan, comprising: a water supply; at least one rotating plate and a housing receiving the plate; each said plate having a front misting surface and a rear surface facing a spinning hub; said hub being mounted on a shaft having a longitudinal axis, said hub having interior and exterior surfaces including a rear and lateral sides; and a water conduit from the water supply to the rotating plate, wherein the water conduit has an opening onto the internal surface of the spinning hub and the spinning hub has at least one through hole in said hub opening onto said at least one rotating plate.

A rotating plate misting fan, comprising: a water supply; at least one rotating plate and a housing receiving the plate; each said plate having a front misting surface and a rear surface facing a spinning hub; said hub being mounted on a shaft having a longitudinal axis, said hub having at least exterior surfaces including a rear and lateral sides, and a plurality of water conduits directing water from the water supply to a plurality of positions onto the exterior surfaces of the hub and/or onto the rotating plate.

A rotating plate misting fan, comprising: a water supply; at least one rotating plate and a housing receiving the plate; each said plate having a front misting surface and a rear surface facing a spinning hub; said hub being mounted on a shaft having a longitudinal axis, and having at least exterior surfaces including rear and lateral sides; and at least one water conduit directing water from the water supply onto the lateral side exterior surface of the hub in a direction said hub is spinning.

The misting fan as disclosed herein, wherein at least one of the plurality of water conduits has an opening onto the lateral side of the exterior surface of the hub, adapted to project water on the exterior surface of the hub parallel to a direction of rotation of the hub.

The misting fan as disclosed herein, wherein the water conduit has an opening onto the exterior surface of the hub above a horizontal midline of the hub and sufficiently inboard of the lateral sides of the hub to prevent water from dropping between the hub and the opening of the water conduit.

The misting fan as disclosed herein, where water is projected onto the interior surface of the hub at a plurality of positions in the hub.

The misting fan as disclosed herein, wherein the hub has a length accommodating two or more rotating plates positioned in series along the hub.

The misting fan as disclosed herein, wherein no surface of the rotating plate is at an angle greater than 100 degrees, measured between the longitudinal axis of the shaft and any plane on the front surface of the plate.

The misting fan as disclosed herein, wherein at least 60% of the rotating plate's surface is perpendicular to the longitudinal axis of the shaft within $\mp 10$ degrees.

The misting fan as disclosed herein, wherein the rotating plate has a plurality of treads and said treads are parallel to each other, diverging less than 10 degrees from being parallel to an adjacent tread.

The misting fan as disclosed herein, wherein when the rotating plate is placed stationary on a flat horizontal surface and water is poured on it, the plate will not cause the water to puddle in concentric rings on the plate.

The misting fan as disclosed herein, wherein the rotating plate has risers between adjacent threads and said risers are shorter than 1 centimeter.

The misting fan as disclosed herein, where the rotating plate is sufficiently thin and flexible that the plate requires no dynamic balancing and self aligns above a predetermined rotation speed.

The misting fan as disclosed herein, wherein the rotating plate has a central hole accommodating the hub and a ratio of a diameter of the central hole to a diameter of the plate is higher than 15%.

The misting fan as disclosed herein, wherein the back "wet" surface of the plate is provided with radial grooves.

The misting fan as disclosed herein, wherein a density of the radial grooves is increased with increasing distance from a center of the plate.

The misting fan as disclosed herein, wherein the back "wet" surface of the plate is textured.

The misting fan as disclosed herein, wherein protuberant teeth extend at intervals between an edge of the housing toward the rotating plate, and wherein each of the protuberant teeth has a longitudinal axis which forms an angle of at least 5 degrees with a radial line from a center of the tooth to a center of the rotating plate.

The misting fan as disclosed herein, wherein, other than an area where teeth and a drain are located, surfaces of the housing are flush with or behind the plate and do not occupy space forward of the plate.

The misting fan as disclosed herein, wherein a drain is located within the housing and behind a front edge of the housing.

The misting fan as disclosed herein, wherein the housing contains capillary trenches arranged circumferentially around the perimeter of the plate to trap water.

The misting fan as disclosed herein, wherein a set of teeth is provided on a ring, attachable to and removable from the housing, whereby a density of teeth is adjustable automatically or manually.

The misting fan as disclosed herein, wherein arcuate sets of teeth are adapted to be interchangeably attached to the housing close to a peripheral edge of the rotating plate.

The misting fan as disclosed herein, wherein the ring comprises a flat surface extending inwardly toward the center of the plate, behind and parallel to the rotating plate.

The misting fan as disclosed herein, wherein two or more of the sets of teeth are adapted to be fastened in an interwoven pattern.

The misting fan as disclosed herein, comprising a drain wrapping around a peripheral portion of the rotating plate section, said peripheral portion comprising an arc of 110 degrees or less, measured from the center of the plate.

The misting fan as disclosed herein, wherein the drain is provided with a secondary shroud adapted to collect water dripping from an outside surface of the drain.

The misting fan as disclosed herein, further comprising capillary channels on the outer surfaces of the drain and or on the inner surfaces of the shroud.

The misting fan as disclosed herein, wherein the drain or the secondary shroud contain a flood, or water block detection system.

The misting fan as disclosed herein, wherein no surface of the drain or secondary shroud is forward of the front edge of the housing.

The misting fan as disclosed herein, wherein the drain is integral with the housing and located behind the rotating plate and behind a forward edge of the housing.

The misting fan as disclosed herein, wherein the drain is constructed from or coated by hydrophilic materials and or hydrophilic patterns.

The misting fan as disclosed herein, comprising a fan mounted behind the housing and the rotating plate and wherein the drain system is shielded from air produced by the fan by a windshield.

The misting fan as disclosed herein, where the windshield is aerodynamically shaped to allow flow lines around the shield.

The misting fan as disclosed herein, wherein a water reservoir is mounted behind the rotating plate.

The misting fan as disclosed herein, wherein the water reservoir contains two shutoff valves in series to minimize the probability of flooding.

The misting fan as disclosed herein, further comprising a shut-down system adapted to evaporate water until the water reservoir is drained.

The misting fan as disclosed herein, where a volume of water projected onto the rotating plate is controlled by a combination of a variable speed pump and a valve mechanism regulating the amount of water coming out of said pump.

The misting fan as disclosed herein, further comprising a range sensor and a controller adapted to automatically adjust vapor rates and/or fan speed, based on an assessment of objects in front of the misting fan and or psychrometric parameters.

The misting fan as disclosed herein, wherein the controller is configured to dynamically modify an operating range allowed by a user interface control unit based on sensor feedback.

The misting fan as disclosed herein, further comprising a forward looking camera and a flashlight that are remotely or automatically operated.

In another aspect, the invention is embodied in a system for controlling an RPMF, or a fleet of RPMFs, wherein each said RPMF is configured for remote programming and control by an RPMF management system configured to alter mist or wind volume responsive to detected ambient and or psychrometric conditions and/or range detection.

The system may comprise a management console enabling remote fleet or individual RPMF setting and over-ride including remote upload of firmware.

The system may comprise sensors monitored remotely to: diagnose malfunctions, alert for malfunctions, and or geofence and restrict use of the evaporative fan based on performance caps, time and location.

In embodiments, the system further comprises a computer application configured to allow control of the fan by a user and for communicating with a management system of the fan. The app may be configured to connect a user by phone or video via the application to the management system for customer service.

In embodiments, the application may be configured to remotely lock the fan's physical control board and allow remote operation only. The application is adapted to automatically alert a user or a management system of any malfunction.

In embodiments, a humidity/temperature sensor is mounted onto conveyor belts which run inside a trailer in order to communicate over the air with the RPMF and adjust the amount of humidity in the trailer.

The system may be placed at a trailer dock door, and a spatial sensor of any type may be used for the gauging and analysis of parcels movements in the trailer whether in the directional vector (loading or unloading) or in the rate of progress along said vector.

The RPMF or a fleet of RPMFs may be installed in one or more trailer docks or inside one or more trailers.

The RPMF air flow may be focused and aimed along and parallel to one of the trailers' side walls.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. A feature disclosed as being associated with one embodiment, or a dependent claim limitation recited as being associated with one independent claim, may be associated with a different embodiment, or with a different independent claim without departing from the scope of the invention. All such combinations are included within the scope of the invention.

The invention claimed is:

1. A cooling system, comprising:
   a water supply;
   at least one rotating plate and a housing receiving the plate; each said plate having a surface to which water is provided and an edge of the plate where droplets of mist are expelled;
   a hub mounted on a shaft having a longitudinal axis about which the rotating plate rotates;
   a flat surface positioned behind the rotating plate, extending outward beyond the peripheral edge of the rotating plate in a radial direction;
   a range sensor, a humidity sensor and a temperature sensor;
   a fan mounted behind the housing; and
   a controller configured to automatically adjust a vapor rate and fan speed as a function of distance to objects in proximity to the rotating plate and psychrometric parameters.

2. The cooling system according to claim 1, wherein the flat surface is parallel to the plate within +/−20 degrees.

3. The cooling system according to claim 1, wherein the flat surface is made of hydrophilic materials, or is provided with a textured surface, or is provided with a textured surface made of hydrophylic materials, adapted to reduce droplet contact angle with the surface to below 30 degrees.

4. The cooling system according to claim 1, wherein said flat surface has an arcuate shape adapted to be attached to the housing proximate the periphery of the plate, wherein the flat surface is further provided with protuberant teeth extending from the flat surface at intervals between an edge of the housing and the rotating plate.

5. The cooling system according to claim 4, further comprising trenches in the housing.

6. The cooling system according to claim 1, wherein the housing and a drain operatively connected to the housing are provided with hydrophilic surfaces.

7. The cooling system according to claim 1, comprising a drain, wherein no portion of the drain is located forward of the rotating plate.

8. The cooling system according to claim 1, comprising a drain wrapping around a peripheral portion of the rotating plate section, said peripheral portion comprising an arc of 110 degrees or less, measured from the center of the plate.

9. The cooling system according to claim 1, comprising trenches on the drain adapted to direct droplets of water by capillary action.

10. The cooling system according to claim 1, wherein the drain is integral with the housing and located behind the rotating plate and behind a forward edge of the housing.

11. The cooling system according to claim 1, comprising either:

a fan mounted behind the housing and the rotating plate and wherein the drain system is shielded from air produced by the fan by a windshield; or a guard forward of the rotating plate adapted to prevent user contact with the plate, and formed of a plurality of guides forming a chevron pattern.

12. The cooling system according to claim 1, further comprising a temperature sensor and a humidity sensor, and wherein the controller is adapted to automatically adjust vapor rates and/or fan speed, based on an assessment of environmental conditions, productivity, safety, presence, distance, and type of objects in front of the misting fan and psychrometric parameters.

13. The cooling system according to claim 1, wherein the controller is configured to dynamically modify an operating range ceiling and floor based on input from a user interface.

\* \* \* \* \*